Jan. 21, 1964  R. H. LACART  3,118,463
TESTING MANIFOLDS
Filed Nov. 29, 1961  2 Sheets-Sheet 1
FIG.1
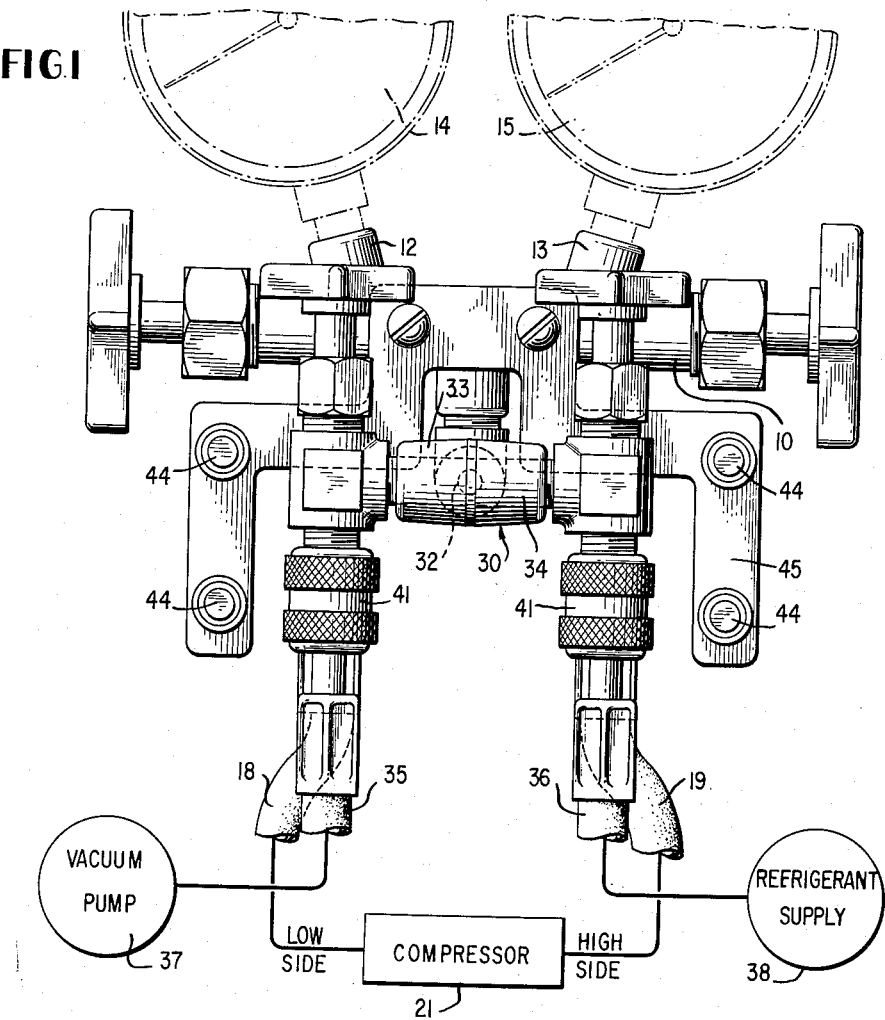
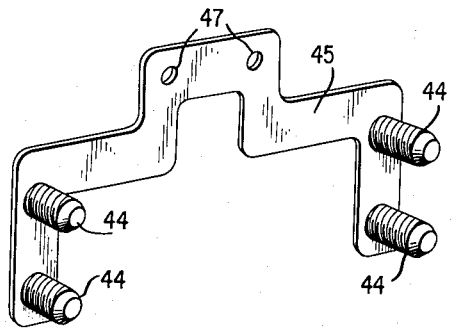
FIG.5
INVENTOR.
ROLLIN H. LACART
BY
ATTORNEY Jan. 21, 1964 R. H. LACART 3,118,463
TESTING MANIFOLDS
Filed Nov. 29, 1961 2 Sheets-Sheet 2
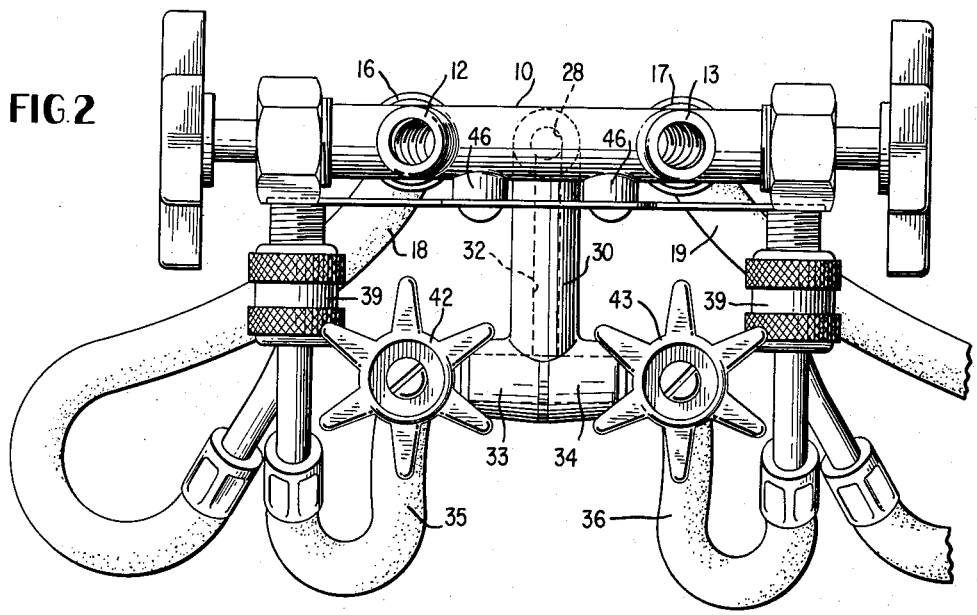
INVENTOR.
ROLLIN H. LACART
BY
ATTORNEY

United States Patent Office

3,118,463
Patented Jan. 21, 1964

3,118,463
TESTING MANIFOLDS
Rollin H. Lacart, Aurora, Ill., assignor to Madco Manufacturing Company, Aurora, Ill., a corporation of Illinois
Filed Nov. 29, 1961, Ser. No. 155,659
4 Claims. (Cl. 137—343)

This invention relates to testing manifolds for refrigerating and air conditioning equipment. This application is a continuation in part of my copending application Serial No. 758,023, now abandoned.

The illustrative testing manifold makes it possible not only to test refrigerating and air conditioning equipment but to evacuate and charge the system without loss of refrigerant or disconnecting and connecting hose lines which would permit entry of moisture.

The nature of the invention and the details thereof may be readily understood by reference to one illustrative apparatus embodying the invention and shown in the accompanying drawings.

In said drawings:

FIG. 1 is an elevation of the apparatus showing diagrammatically its connection to the refrigerating system and refrigerant supply and accessory vacuum pump;

FIG. 2 is a plan view of the apparatus (with the gauges removed) showing the coupler bar for sealing the ends of the hose lines to prevent entry of moisture and dirt when the lines are not in use;

FIG. 3 is a front elevation of the apparatus, partly in section;

FIG. 4 is a sectional view taken on the plane 4—4 of FIG. 3; and

FIG. 5 is a perspective view of the coupler bar for closing and sealing the ends of the several hose lines when not in use, to prevent entry of moisture and dirt.

The illustrative manifold serves not only to test refrigerating and air conditioning equipment as an aid to obtain efficient operation but to add refrigerant and otherwise service the system or to dry out the system by removing moisture. Moisture in such equipment is serious and it is essential that it be removed from the system and its entry thereto be prevented. The present testing apparatus is designed to permit attachment to the equipment to be tested so that complete servicing may be effected without uncoupling any hoses to shift from one place to another, thus insuring against the entry of moisture. Furthermore, when the testing equipment is not in use, it is sealed against the entry of moisture or dirt which might eventually be transferred to refrigerating apparatus being tested.

Essentially, the testing apparatus comprises a manifold 10 in the form of an elongated housing having a central passage 11 (FIG. 3) and branching outlets 12 and 13 to which pressure and vacuum gauges 14 and 15 are adapted to be connected. To reduce the length of the housing to a minimum, the outlets 12 and 13 project therefrom at diverging angles to provide space for the gauges 14 and 15 whose combined width exceeds the spacing between the outlets.

The housing also carries a pair of terminals 16 and 17 provided with flexible hose lines 18 and 19 carrying knurled swivel couplings by which the hose lines may be connected both to the manifold and low and high side respectively of the compressor 21 in the equipment to be tested and serviced. Such equipment is represented diagrammatically in FIG. 1 by the compressor only, since the compressor is generally provided with valves and coupling fittings for connecting the hose lines from the testing manifold. Other parts of the equipment are tested by means of the connections with the high and low sides of the compressor.

Communication of the respective lines 18 and 19 with the housing passage 11 is controlled by valves 22 and 23. However passages 24 in the respective terminals 16 and 17 lead around the valve stems of the respective valves and connect with the passages 25 in gauge terminals 12 and 13 respectively, independently of the valves, so that the gauges are continuously in communication with the respective hose lines independently of the valves.

The valves are advantageously provided with nylon seats 26 and Teflon packings 27 to insure tight seating of the valves and sealing of the valve stems and therefore to insure operation of the valves with a minimum of force. Teflon is the trade name of a fluoro-carbon polymer, specifically poly tetrafluoro-ethylene. It is resilient with low friction or self-lubricating qualities. It is therefore ideal for valve stem packing.

The valves control communication between the low and high sides of the compressor (through the respective lines 18 and 19) with an intermediate passage 28 which communicates with passage 11 in the manifold housing. Passage 28 is in a terminal 29 connecting with a branching fitting 30 whose common passage 31 leads to the branching passages 32 in branching terminals 33 and 34. Passages in terminals 33 and 34 communicate with passages 32 and lead respectively to hose lines 35 and 36 which are adapted to be connected respectively to vacuum pump 37 and a supply of gas 38. The gas supply may be either a supply of refrigerant or a supply of dry nitrogen (or other drying gas) used for drying out and absorbing moisture in the system, depending on the nature of the service required.

As stated above, the free ends of the hose lines 18, 19, 35 and 36 are provided with knurled swiveled couplings 39 and 41 for easy connection to the equipment, service accessories and manifold terminals.

Hose lines 18, 19, 35 and 36 may advantageously be colored differently or otherwise distinctively marked to avoid error in connecting the manifold to the apparatus to be tested and to the service accessories. For example, lines 18 and 19 for the low and high sides of the compressor may be colored blue and red respectively, and lines 35 and 36 for the vacuum pump and gas supply, yellow and white respectively.

The branching terminals 33 and 34 are provided respectively with valves 42 and 43 (also having nylon seats and Teflon packings) for controlling communication of the service accessories 37 and 38 with manifold passage 11 and the low and high sides of the compressor. Servicing which requires drying out of the system with the use of dry nitrogen or the like is less frequently necessary than normal servicing which involves testing and addition or partial removal of refrigerant. When the system is to be dried a supply of nitrogen or other drying gas is connected to line 36 in place of the refrigerant supply 38. Fresh refrigerant itself could effect drying but it is much more expensive than introducing drying nitrogen into the system. If drying be effected with nitrogen, the system is preferably evacuated by the vacuum pump after shutting off further supply of nitrogen.

After servicing the equipment, the hose lines are advantageously sealed (after disconnection from the refrigerating equipment), by plugging the ends of terminals 39. This is effected in the present instance by screwing the respective swiveled terminals 39 tightly on threaded imperforate sealing plugs 44 carried by coupler bar 45 (FIGS. 2 and 5). The coupler bar is advantageously carried by the manifold housing, for which purpose threaded bosses 46 are provided to receive bolts which pass through holes 47 in the coupler bar. The latter may therefore be removed from the housing if desired.

In using the testing manifold only those hose lines which are required for testing and servicing are disconnected from the coupler bar. Those not used remain sealed.

Obviously the invention is not limited to the details of the illustrative apparatus since these may be variously modified. Moreover it is not indispensable that all features of the invention be used conjointly, since various features may be used to advantage in different combinations and sub-combinations.

Having described my invention I claim:

1. A testing manifold for refrigerating units comprising in combination an elongated body having a fluid passage extending longitudinally thereof, a spaced pair of connections projecting from said body and communicating with said passage, hose lines extending from said pair of connections, a third connection projecting from said body intermediate of said pair of connections and also communicating with said passage, said hose lines having threaded swiveled couplings at their free ends, and a supporting member on said body provided with sealing fittings for said swivel couplings for closing the ends of said lines when lines are not in use.

2. A testing manifold for refrigerating units comprising in combination an elongated body having a fluid passage extending longitudinally thereof, a spaced pair of connections projecting from said body and communicating with said passage, hose lines extending from said pair of connections, a third connection projecting from said body intermediate of said pair of connections and also communicating with said passage, said hose lines having threaded swiveled couplings at their free ends, and a removable coupler bar having threaded sealing plugs for each of said lines projecting therefrom and to which said hose couplings are adapted to be threaded to seal said lines when the latter are not in use.

3. A testing manifold for refrigerating units comprising in combination an elongated body having a fluid passage extending longitudinally thereof, a spaced pair of connections projecting from said body and communicating with said passage, a valve at each end of said body for controlling communication of the respective connections with said passage, flexible hose lines connected with said connections and having terminal couplings to adapt the same for connection with the refrigerating unit to be tested, a connection intermediate said pair of connections in communication with said passage and having a pair of branching terminals respectively carrying flexible hose lines, the latter hose lines also having terminal couplings, said branching terminals having valves for controlling said hose lines respectively, and a pair of gauge connections projecting from said body and communicating respectively with said pair of connections above the respective valves for said pair of connections, so as always to be in communication with the said connections independently of said valves.

4. A testing manifold for refrigerating units comprising in combination an elongated body having a fluid passage extending longitudinally thereof, a spaced pair of connections projecting from said body and communicating with said passage, a valve at each end of said body for controlling communication of the respective connections with said passage, a pair of pressure gauges carried by said body and connected respectively with the respective pair of connections independently of said valves, flexible hose lines connected with said connections and having terminal couplings to adapt the same for connection with the refrigerating unit to be tested, a connection intermediate said pair of connections in communication with said passage, said intermediate connection having a pair of branching terminals respectively carrying flexible hose lines, the latter lines also having terminal couplings, and a pair of gauge connections projecting from said body and communicating respectively with said pair of connections above the respective valves for said pair of connections, so as always to be in communication with the said connections independently of said valves.

References Cited in the file of this patent

UNITED STATES PATENTS

| 1,984,999 | Stoddard | Dec. 18, 1934 |
| 2,355,270 | Campbell | Aug. 8, 1944 |
| 2,490,839 | Shaffer | Dec. 13, 1949 |
| 2,821,210 | Liley | Jan. 28, 1958 |

FOREIGN PATENTS

| 421,939 | France | Mar. 8, 1911 |